Dec. 26, 1967  R. N. SUNDSTROM ET AL  3,360,352
APPARATUS FOR AND METHOD OF SHAPING THE OPEN END
OF GLASS TUBES BETWEEN COOPERATING ROLLERS
Filed Aug. 25, 1964

INVENTORS
ROY N. SUNDSTROM
BY ARTHUR H. WILDER

Sughrue, Rothwell, Mion, Zinn & Macpeak
ATTORNEYS

United States Patent Office 3,360,352
Patented Dec. 26, 1967

3,360,352
APPARATUS FOR AND METHOD OF SHAPING THE OPEN END OF GLASS TUBES BETWEEN COOPERATING ROLLERS
Roy N. Sundstrom, Corning, and Arthur H. Wilder, Painted Post, N.Y., assignors to Corning Glass Works, Corning, N.Y., a corporation of New York
Filed Aug. 25, 1964, Ser. No. 391,960
6 Claims. (Cl. 65—109)

ABSTRACT OF THE DISCLOSURE

Apparatus for shaping glass tube ends to ensure circumferentially constant wall thickness at desired areas comprising spaced, driven rollers mounted for rotation about parallel axes and engaging, respectively, the inner and outer surface of the tube, the rollers defining a fixed working zone, one of said rollers having a circumferential recess to define a relief zone which forms a part of the working zone.

---

In the production of certain glass products from glass tube stock as in the manufacture of jars or vials, it is desirable to shape the open end of the ware. This may be conveniently achieved by inserting the open end of the glass tube between a pair of rollers mounted for rotation about parallel axis. With the tube in a softened condition, it is held under pressure between the two rollers, with one roller engaging the outer surface of the cylinder or tube while the other roller engages the inner surface and depending upon the particular surface configuration of the rollers, the tube tends to achieve a circumferential configuration defined by the cavity or space existing between the hardened, forming rollers.

Because the glass tube prior to shaping is never perfectly uniform in wall thickness and roundness, the end of the tube being formed does not always have a perfectly flat end. The glass varies in thickness around the periphery of the open end as it is brought to the softening point by suitable heating means prior to shaping. The heating means in some cases is positioned in proximity to the shaping rollers to heat the tubular member as it is held between the rollers during shaping. As a result, during rotation of the glass tube between the rollers, the uneven wall thickness causes uneven pressure to develop on the glass, even when one of the rollers is spring-biased into its pressure position. The resulting pressure differential creates surface imperfections called "crizzle" or "checking" which are detrimental to the product application.

In the past, it has been common to spring load one or both of the rollers to prevent this occurrence, so that when an area of increased wall thickness was encountered, one of the rollers would move away from the other to reduce the high pressure developed on the glass. Such spring loading, however, had a tendency to vary the cross sectional thickness of the end being formed in order to accomplish its purpose. Additionally, this means does not react fast enough to abrupt changes in thickness because of the physical inertia of the parts.

It is, therefore, a primary object of this invention to provide an improved glass shaping apparatus in which uneven pressures on the ware during shaping are prevented, thus eliminating the possibility of "crizzle" or "checking."

It is a further object of this invention to provide an apparatus for shaping the open end of tubular pieces of glass in which the wall thickness of the finished ware is completely uniform regardless of non-uniformity in wall thickness prior to shaping.

It is a further object of this invention to provide an improved method of and apparatus for shaping the open end of a tubular piece of glass which provides an area of virgin glass within the working zone which may be desirable for use in subsequent bonding of elements to the shaped tubular ware.

An additional object of this invention is to provide a relief zone in the shaping of the open end of a tubular piece, which not only relieves uneven rolling pressures, but also facilitates the formation of an inner virgin lip or rim which provides additional radial load strength required for capping operations.

Further objects of this invention will be pointed out in the following detailed description and claims and illustrated in the accompanying drawing which discloses, by way of example, the principle of this invention and the best mode which has been contemplated of applying that principle.

In general, the improved apparatus of this invention comprises a pair of spaced shaping or forming means for engaging the open end of a tubular piece of glass. In a preferred form, the forming means comprises spaced rollers mounted for rotation about parallel axes with one roller engaging the outer surface of the tube and the other engaging the inner surface of the tube. The rollers define a fixed working zone for engaging a portion of the tube therebetween to reduce the portion to a circumferentially uniform radial thickness. In addition, the rollers further define a relief zone, forming a part of the working zone, wherein a portion of the tube may vary circumferentially in radial thickness, thus preventing uneven pressure developing on the glass and the resultant crizzling or checking.

Figure 1:
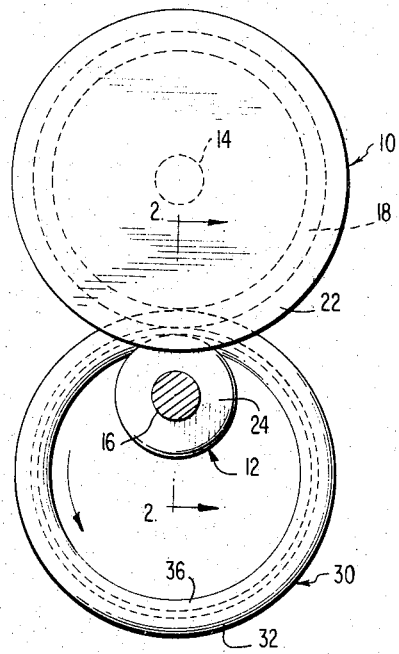
FIGURE 1 is a front elevational view of one embodiment of the present invention, partly in section, showing the overlapping relation of one forming roll with respect to the other.
Figure 2:
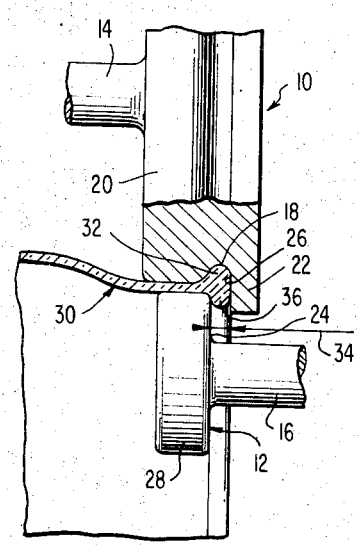
FIGURE 2 is a side elevational view, partially in section, on the line 2—2 of FIGURE 1.

Referring to FIGURES 1 and 2 of the drawing, there is shown one form of the apparatus of the present invention. A first outer, shaping or forming roller 10 is positioned in proximity to a second, inner, shaping or forming roller 12 for rotation about respective parallel axes. Roller 10 is mounted for rotation about the axis of shaft 14 to which it is fixed, while shaft 16 carries the inner roller 12 for rotation about its axis. Rollers 10 and 12 may be formed of hardened steel as is conventional in the art, but unlike the prior art glass shaping apparatus, the axes of both the forming rollers 10 and 12 remain fixed during shaping, and are characterized by the absence of spring biasing means tending to move one roller toward the other, for the purpose of preventing uneven pressure from developing on the glass as a result of varying tubular wall thickness. Of course, the rollers are moved apart prior to shaping to allow tube insertion therebetween, but remain relatively fixed during shaping.

The width of the inner roller 12 is shown substantially less than that of the outer roller 10, however, it may be wider than roller 10 if desired. In addition, roller 10 includes a groove 18 formed within the peripheral surface 20 and is further characterized by the presence of a radially extending flange 22 positioned adjacent the groove 18, the diameter of the flange portion 22 of roller 10 being somewhat greater than the diameter of the portion of roller 10 on the opposite side of the groove 18 from flange 22. The diameter of the inner roller 12 is shown as generally constant although it may be tapered if desired, and the roller 12 is laterally positioned with respect to roller 10 such that a portion of the face 24 of roller 12 and a portion of the inner surface 26 of flange 22 are in overlapping relationship.

It can be said that the opposed peripheral surfaces 20 and 28 of rollers 10 and 12, as well as peripheral groove 18 and the inner face 26 of the flange portion 22 of roller 10 provide a "working zone" insofar as the shaping operation is concerned. Since the open end of the tubular piece of glass 30 is held in a softened condition between the spaced rollers 10 and 12, which are rotated in opposite directions, and since the parallel axes of the rollers are held in precise position with the gap between the opposed peripheries 20 and 28 of the rollers being less than the average wall thickness of the tube prior to shaping, there will be a tendency for the glass positioned within the working zone, as a result of the pressure afforded by the rotating rollers 10 and 12, to move axially toward the area defined by the peripheral groove 18 and the inner face 26 of flange 22.

The peripheral groove 18 is formed within the surface of the outer roller 10 to a desirable depth and configuration to produce a radially extending lip of constant circumferential dimension which is conventional in glass bottles and vials for the purposes of providing both a reinforced outer end to the tubular vial or bottle, and at the same time allowing use in conjunction with a cover member for sealing the open end of the bottle. Thus, the tubular ware 30 will include after forming or shaping, an outer lip portion 32 which is conventional in the art.

At the same time, due to the spacing between the face 24 of inner roller 12 and the face 26 of the overlapping flange portion 22 of roller 10, there will be provided a "relief zone" indicated by arrow 34. This relief zone allows the formation of a second radial lip portion 36 within the open end of tubular ware 30. The inward rim or lip 36 varies in dimension, depending upon the varying wall thickness of the tubular ware 30 prior to the shaping operation. Thus, the relief zone allows for the free formation of a mass of virgin glass, this portion being created by the flow of glass to the axial portion of the tube not contacted by the inside roller. It is to be noted that the relief zone is within an area defined by the faces of the rollers, and accordingly its width may be varied as desired, by relative longitudinal positionment of the rollers, to regulate glass movement therein. The peripheral surface of the rim 36 is clean or "virgin" in nature since it is untouched by any of the forming surfaces. The rollers 10, 12 may be rotated by driving the glassware 30 and allowing the rollers to idle, or if desired they may be driven by a suitable known external source through shafts 14, 16.

It is apparent therefore that the apparatus corrects the deficiency of the prior art devices by permitting the rollers to be rigidly mounted, while avoiding either the inherent cracking or checking which results from excessive pressures on the glass produced by thickness variations in tube to be formed. Glassware of circumferentially varying radial thickness is thereby reduced to a uniform radial thickness with any excess flowing to the relief area provided between the end of the inner roller and the axially extending end of the outer roller.

Figure 3:
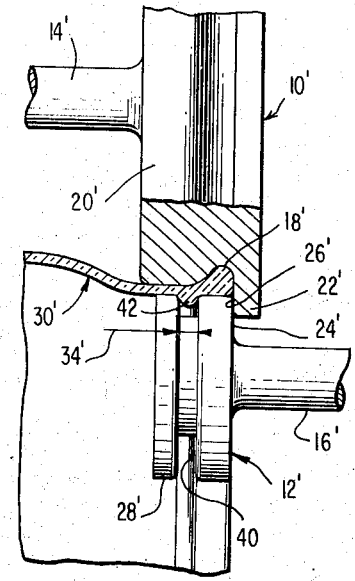
FIGURE 3 is a side elevational view, partially in section, of a second embodiment of the present invention.

A second embodiment of the present invention is shown in FIGURE 3. The elements and their method of operation are quite similar to those shown in the FIGURE 1 and FIGURE 2 embodiment. A pair of oppositely rotating rollers 10' and 12' are mounted for respective rotation about the axes of shafts 14' and 16', the rollers being mounted for rotation about fixed axes, thus providing a non-varying gap between respective peripheries 20' and 28' in like manner to the first embodiment. A peripheral groove 18' is formed within the peripheral surface 20' of the outer roller 10' and the roller 10' further includes a radially extending flange portion 22' of larger diameter than the main section of this roller. The roller 12' is shown having a face 24' positioned in close adjacency to inner surface 26' of the flange 22' in an overlapping relationship, to thus prevent the formation of fins.

Unlike the previous embodiment, the working zone is defined by the peripheries 28', 20' and the peripheral groove 18'. A "relief zone" is formed intermediate the extremes of the working zone rather than at one side thereof, the relief zone being indicated by the opposed arrows 34'. The inner roller 12' is provided with a rather deep peripheral groove 40 of desired depth which forms the relief zone and acts to receive any excess glass which may be developed during the forming process as a result of prior non-uniformity of wall thickness of the tubular glassware 30'.

Since the glass tube 30' is softened for the shaping operation, and since the axes of the rotating forming members 10' and 12' remain fixed, the pressures created upon the glass due to non-uniformity in glass wall thickness merely creates an excess of glass material which will follow the path of least resistance and tend to flow to the peripheral groove 40 forming a bulge or rim 42 along the inner surface of the formed glass member. In like manner to the previous embodiment, the presence of the peripheral groove 18' within the outer roller 10' produces the conventional exterior lip for the purposes of aiding in affixing a top or cover to the bottle. The presence of an inner rim 42 of varying thickness not only allows the production of a finished product having uniform radial thickness at the desired areas, that is, adjacent rim 18', but also the excess glass due to non-uniformity in glassware thickness prior to forming which flows within the groove 40 of inner roll 12' during the forming operation provides for increased resistance to radial loads. Again, the surface of the lip 42 since it has not contacted either of the forming rolls 10' or 12' is in "virgin" condition as an aid to subsequent bonding operations.

In both the embodiments shown in FIGURES 2 and 3, the "relief zone" results in the formation of an internal section of varying thickness to produce a product having constant relative outer diameter and uniform radial thickness in a preferred area. It is readily apparent, that if desired, the "relief zone" may be provided in such a manner as to allow the formation of an exterior area of non-uniform thickness by providing a suitable groove in the outer roller similar to the groove 40 in inner roller 12' in the FIGURE 3 embodiment or, by the employment of an inner roller of greater width than outer roller 10 in the FIGURE 2 embodiment and the placement of flange means on the inner roller. Further, if desired, more than one pair of rollers may be utilized to shape the tube.

While there have been shown and described and pointed out the fundamental novel features of the invention as applied to preferred embodiments, it will be understood that various omissions and substitutions and changes in the form and detail of the devices illustrated in this and in their operation may be made by those skilled in the art without departing from the spirit of the invention. It is the intention, therefore, to be limited only as indicated by the scope of the following claims.

What is claimed is:

1. In an apparatus for forming the open end of a glass tube including means for positioning the malleable end of said tube in contact with forming means, first forming means for engaging the outer surface of a tube, second forming means for engaging the inner surface of said tube, said first and second forming means defining a working zone of fixed dimension for engaging a portion of the tube therebetween to reduce said portion to a circumferentially uniform radial thickness, and relief means forming a part of said working zone and formed intermediate end portions of at least one of said forming means, whereby the portion of said tube within said relief zone is defined longitudinally while being free to circumferentially vary in radial thickness as a result of non-uniformities in the tube wall thickness of said glass tube prior to shaping.

2. The apparatus as claimed in claim 1 wherein said first forming means comprises a hardened forming roller mounted for rotation about a first axis, said second forming means comprises a hardened roller mounted for rotation about a second axis, said second axis being parallel to said first axis and fixed with respect thereto, and said means for defining a relief zone comprises a circumferential groove formed peripherally in one of said rollers intermediate adjacent end surface portions.

3. The apparatus as claimed in claim 1 wherein said first forming means comprises a first roller fixed for rotation about a first axis, and said second forming means comprises a second roller mounted for rotation about a second axis, said first and second axis being parallel and fixed with respect to each other and one of said rollers being wider than said other roller and including a radial flange providing peripheral overlap with the inner surface of said overlapped flange being spaced axially from the opposed surface of said other roller to produce said relief zone.

4. In an apparatus for forming the open end of a softened glass tube including means for positioning the softened end of said tube in contact with forming means, a first roller mounted for rotation about a fixed axis for peripheral engagement with the outer surface of said tube, a second roller positioned for rotation about a second fixed axis parallel to said first axis for peripheral contact with the inner surface of said tube and thereby defining a working zone therebetween to reduce said portion to a circumferentially uniform radial thickness, said first roller further including a peripheral groove formed intermediate end portions of said roller and within the working zone for creating an outer lip of constant circumferential dimension at the end of said glass tube, said first roller further including a radial flange portion having a diameter in excess of the major portion of said roller, said flange portion being formed adjacent said peripheral groove and positioned in peripheral overlap with said inner roller but spaced therefrom to provide a relief zone, whereby said formed glass tube is longitudinally defined and provided with an area which may vary freely in circumferential radial thickness as a result of tube wall thickness variation prior to shaping.

5. In an apparatus for forming the open end of a glass tube including means for positioning the softened end of said tube in contact with forming means, a first forming roller positioned for rotation about a fixed axis for peripheral engagement with the outer surface of said tube, a second roller mounted for rotation about a second fixed axis parallel to said first axis for peripherally engaging the inner surface of said tube, a peripheral flange portion formed on said outer roller of greater diameter than the remaining portion of said outer roller, said flange being positioned in close adjacency to the edge of said second roller in overlapping relation therewith, said second roller being provided with a peripheral groove intermediate of its ends forming a relief zone for receiving excess glass flow as a result of non-uniformity in tube wall thickness of said glass tube prior to shaping, said first and second roller with the exception of said radial flange engaging the outer end of said tube therebetween to reduce said portion to a circumferentially uniform radial thickness.

6. An improved method of forming the open end of a glass tube having non-uniform wall thicknesses to provide a shaped circumferentially-constant wall thickness which comprises, rotating a softened tube to be finished about its longitudinal axis, continuously rotating an end portion of said rotating tube through a confined work zone of fixed limits to reduce said end portion to a circumferentially uniform radial thickness, and flowing excess glass radially into a relief zone communicating with said confined zone to compensate for non-uniform wall thicknesses present in the tube prior to shaping while maintaining a desired longitudinal dimension.

References Cited

UNITED STATES PATENTS

| | | | |
|---|---|---|---|
| 668,223 | 2/1901 | Rudolph | 65—296 X |
| 3,202,495 | 8/1965 | Zauner | 65—294 X |

DONALL H. SYLVESTER, *Primary Examiner.*

A. D. KELLOGG, *Assistant Examiner.*